(12) United States Patent
Aggarwal

(10) Patent No.: US 7,130,304 B1
(45) Date of Patent: Oct. 31, 2006

(54) METHOD AND APPARATUS FOR GRACEFUL RESTART

(75) Inventor: Rahul Aggarwal, San Francisco, CA (US)

(73) Assignee: Redback Networks Inc., San Jose, CA (US)

( * ) Notice: Subject to any disclaimer, the term of this patent is extended or adjusted under 35 U.S.C. 154(b) by 1007 days.

(21) Appl. No.: 10/159,341

(22) Filed: May 31, 2002

(51) Int. Cl.
*H04L 12/56* (2006.01)

(52) U.S. Cl. ....................... 370/389; 370/392

(58) Field of Classification Search ............... 370/389, 370/392, 419; 709/237, 238
See application file for complete search history.

(56) References Cited

U.S. PATENT DOCUMENTS

| | | | |
|---|---|---|---|
| 6,704,795 B1* | 3/2004 | Fernando et al. | 709/237 |
| 2003/0110287 A1* | 6/2003 | Mattson | 709/238 |
| 2003/0210705 A1* | 11/2003 | Seddigh et al. | 370/419 |
| 2004/0001485 A1* | 1/2004 | Frick et al. | 370/389 |
| 2004/0114595 A1* | 6/2004 | Doukai | 370/389 |

OTHER PUBLICATIONS

Andersson, L., et al., "LDP Specification," Network Working Group Request for Comments: 3036, Jan. 2001.
Awduche, D., et al., "RSVP-TE: Extensions to RSVP for LSP Tunnels," Network Working Group Request for Comments: 3209, Dec. 2001.
Braden, R., et al., "Resource ReSerVation Protocol (RSVP)—Version 1 Functional Specification," Network Working Group Request for Comments: 2205, Sep. 1997.
Braden, R., et al., Resource ReSerVation Protocol (RSVP)—Version 1 Message Processing Rules, Network Working Group Request for Comments 2209, Sep. 1997.
Davis, B, et al., "MPLS Using LDP and ATM VC Switching," Network Working Group Request for Comments: 3035, Jan. 2001.
Moy, J., "Hitless OSPF Restart," Network Working Group Internet Draft, http://search.ietf.org/internet-drafts/draft-ietf-ospf-hitless-restart-02.txt, Feb. 2002.
Rosen, E., et al., "Multiprotocol Label Switching Architecture," Network Working Group Request for Comments: 3031, Jan. 2001.
Sangli, S. R., et al., "Graceful Restart Mechanism for BGP," Network Working Group Internet Draft, http://search.ietf.org/internet-drafts/draft-ietf-idr-restart-05.txt, Jun. 2002.
Zinin, A., et al., "OSPF Restart Signaling," Network Working Group Internet Draft, http://search.ietf.org/internet-drafts/draft-nguyen-ospf-restart-00.txt, Mar. 2002.

* cited by examiner

*Primary Examiner*—Hassan Kizou
*Assistant Examiner*—Albert T. Chou
(74) *Attorney, Agent, or Firm*—Blakely, Sokoloff, Taylor & Zafman LLP (57) ABSTRACT

A method and apparatus for graceful restart is described. A method in a network device provides for refreshing a set of one or more labels after a label propagation module has restarted, the set of one or more labels having been allocated for the label propagation module prior to the label propagation module dying, and communicating the refreshed set of labels to a set of one or more peer label switching network devices.

27 Claims, 9 Drawing Sheets

| LABEL IDENTIFIER 101 | EXPERIMENTAL 105 | STACK BIT 103 | TTL 107 |
|---|---|---|---|

LABEL STACK ENTRY 100

METHOD AND APPARATUS FOR GRACEFUL RESTART

BACKGROUND OF THE INVENTION

1. Field of the Invention

The invention relates to the field of communication. More specifically, the invention relates to communication networks.

2. Background of the Invention

The multi-protocol label switching (MPLS) protocol may be categorized as a network layer protocol of the Open Standards Institute (OSI) reference model. MPLS provides a method for generically tunneling data through networks with label switching paths (LSPs).

Figure 1:
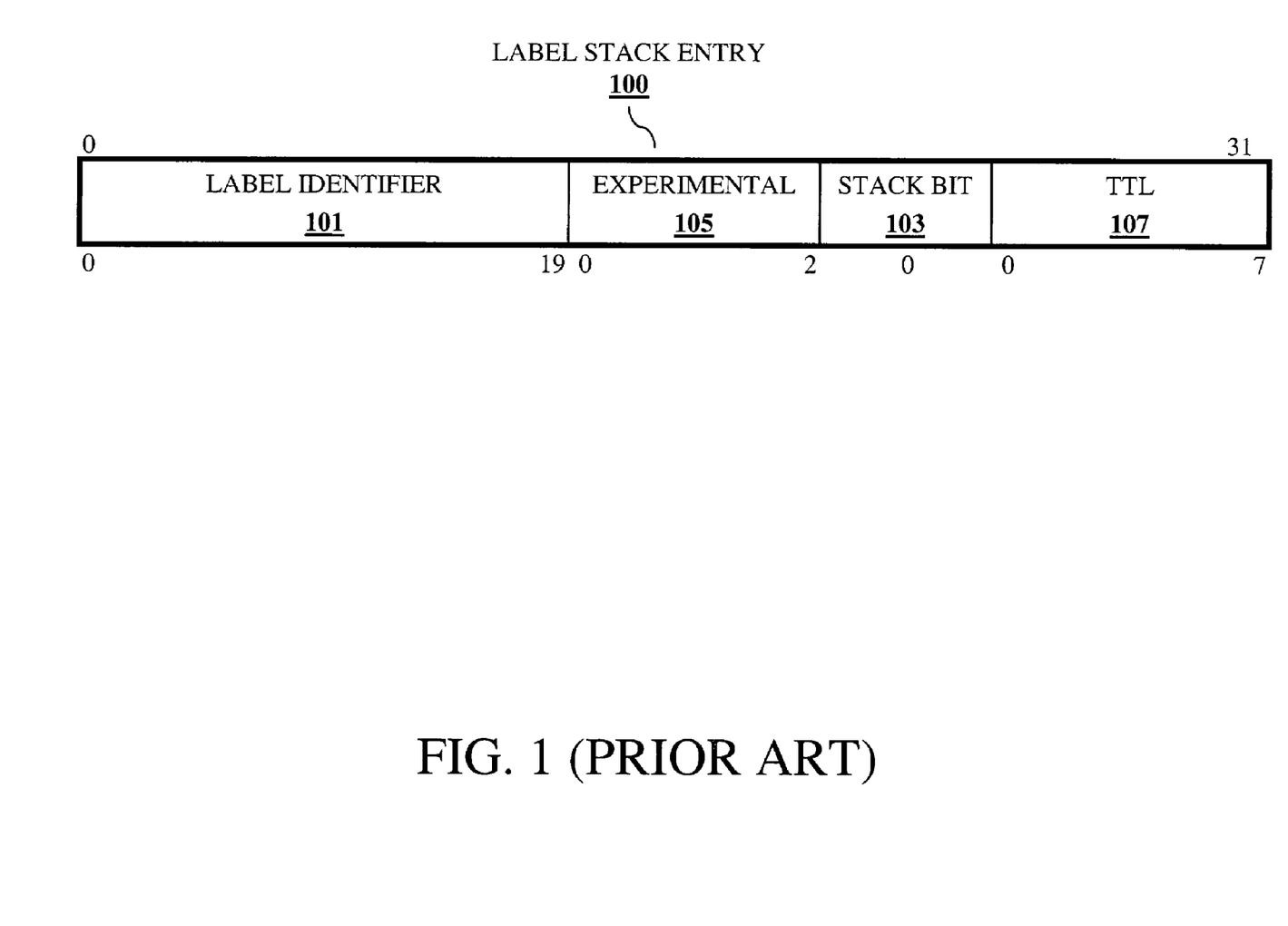
FIG. 1 (Prior Art) is a diagram of a label stack entry according to multi-protocol label switching (MPLS).

FIG. 1 (Prior Art) is a diagram of a label stack entry according to multi-protocol label switching (MPLS). A label stack entry 100 is a 32-bit value that includes the following fields: a label identifier field 101, a stack bit field 103, an experimental field 105, and a time to live field 107. The label identifier field 101 includes a 20-bit value identifying a label for a label switch to path (LSP). The stack bit field 103 includes a single bit to indicate whether the label stack entry 100 is the last label stack entry of a packet. The experimental field 105 includes 3 bits reserved for experimental purposes. The time to live field 107 includes 8 bits to indicate the number of hops a label stack entry should exist.

To be used, a label identified by the label identifier field 101 is allocated and then propagated by a label distribution protocol (LDP) module of a label switching router (LSR). The label is passed from the LSR to an upstream LSR for a specific label switched path (LSP) that traverses the upstream LSR and the LSR. If the LSP module of the LSR dies for some reason, the LSR deletes all labels previously allocated for the dead LSP module. In addition, the upstream LSR deletes all forwarding entries with labels learned from the LSR. Since all of the labels propagated by the LSR are deleted, 1) traffic cannot be forwarded along the LSP from the upstream LSR to the LSR and 2) the LSR must allocate another label for the LSP and communicate the newly allocated label to the upstream LSR.

BRIEF SUMMARY OF THE INVENTION

A method and apparatus for graceful restart is described. According to one aspect of the invention, a method in a network device provides for refreshing a set of one or more labels after a label propagation module has restarted, the set of one or more labels having been allocated for the label propagation module prior to the label propagation module dying, and communicating the refreshed set of labels to a set of one or more peer label switching network devices.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

In the description, the following terms are used: ingress label switching network device, transit label switching network device, egress label switching network device, upstream peer label switching network device, and downstream peer label switching network device. A transit label switching network device is a network device that supports a label switched path (LSP) and is neither the ingress label switching network device nor the egress label switching network device. The transit label switching network device is a network device that is an intermediate point along an LSP. An ingress label switching network device is a network device that supports an LSP and is the point of origin of the LSP. An egress label switching network device is a label switching network device that terminates the LSP. A transit label switching network device has an upstream peer label switching network device and a downstream peer label switching network device. A peer label switching network device is upstream from a transit label switching network device if the peer label switching network device is a point along the LSP before the transit label switching network device. A peer label switching network device is downstream from a transit label switching network device if the peer label switching network device is a point along the LSP after the transit label switching network device. The upstream peer label switching network device may be an ingress label switching network device while the downstream peer label switching network device may be an egress label switching network device.

Figure 2A:
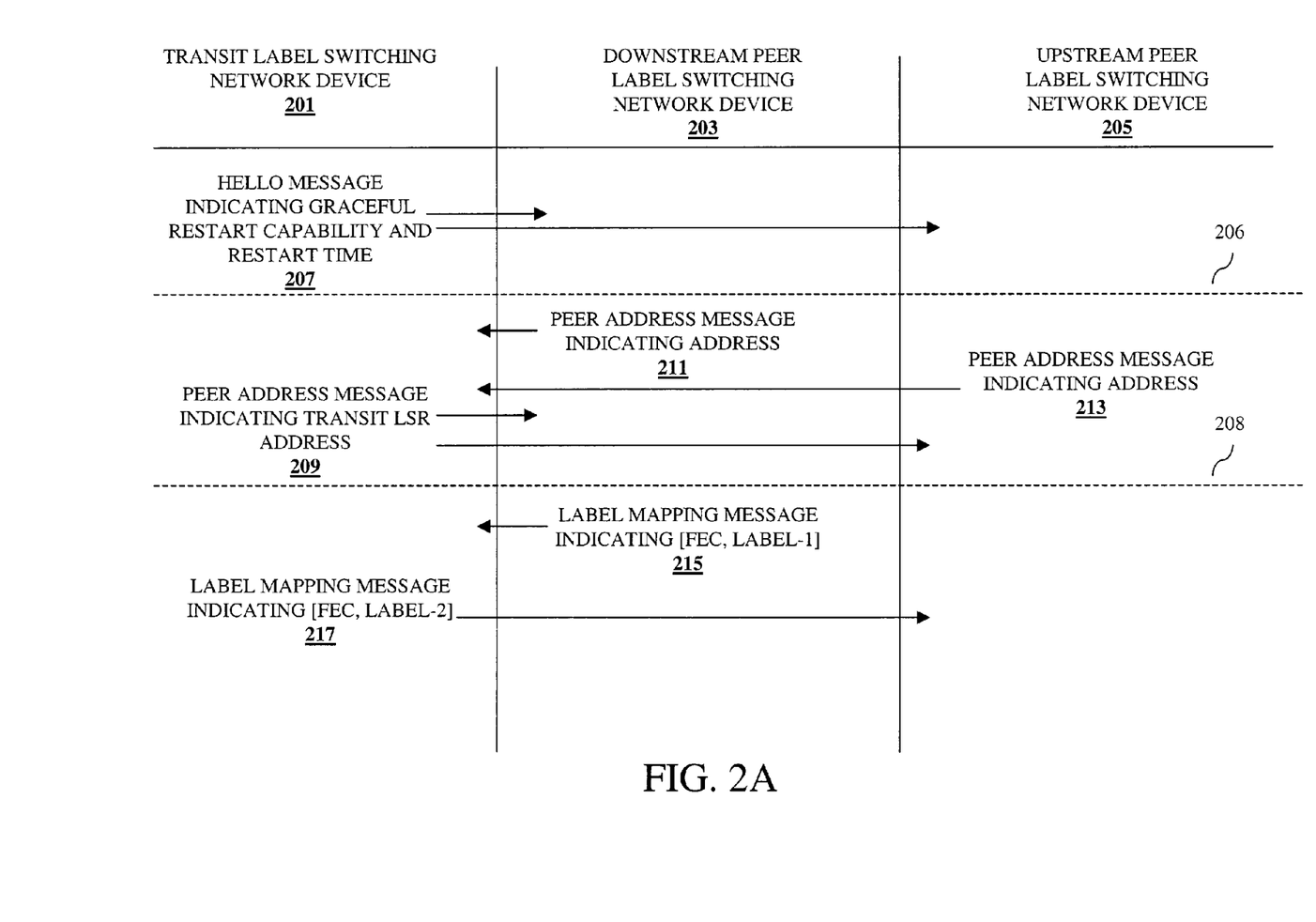
FIG. 2A is an exemplary diagram illustrating communications between peer label switching network devices across time according to one embodiment of the invention.

FIG. 2A is an exemplary diagram illustrating communications between peer label switching network devices across time according to one embodiment of the invention. For FIG. 2A, a label switched path (LSP) traverses three label switching network devices: a transit label switching network device 201, its upstream peer label switching network device 205, and its downstream peer label switching network device 203. In FIG. 2A, a dashed line 206 separates a first time frame and a second time frame. In the first time frame, the transit label switching network device 201 transmits a hello message 207 indicating graceful restart capability and a restart time. The hello message 207 is used to discover neighboring routers. The transit label switching network device 201 transmits the hello message 207 to a downstream peer label switching network device 203 and an upstream peer label switching network device 205. In the second time frame, the downstream peer label switching network device 203 transmits a peer address message 211 indicating the address of the downstream peer label switching network device 203. The upstream peer label switching network device 205 also transmits a peer address message that indicates the address of the upstream peer label switching network device 205 within the second time frame. In the same time frame, the transit label switching network device 201 transmits a peer address message 209 that indicates the transit label switching network device's address to both the downstream peer label switching network device 203 and the upstream peer label switching network device 205.

A dashed line 208 separates the second time frame from a third time frame. In the third time frame, the downstream peer label switching network device 203 transmits a label mapping message 215 that indicates a label binding [FEC, LABEL-1]. This label binding indicates that the LABEL-1 is to be used along the LSP to reach the indicated forward equivalence class (FEC). Also in the third time frame, the transit label switching network device 201 transmits a label mapping message 217 to the upstream peer label switching network device 205. The label mapping message 217 indicates a label binding [FEC, LABEL-2].

Figure 2B:
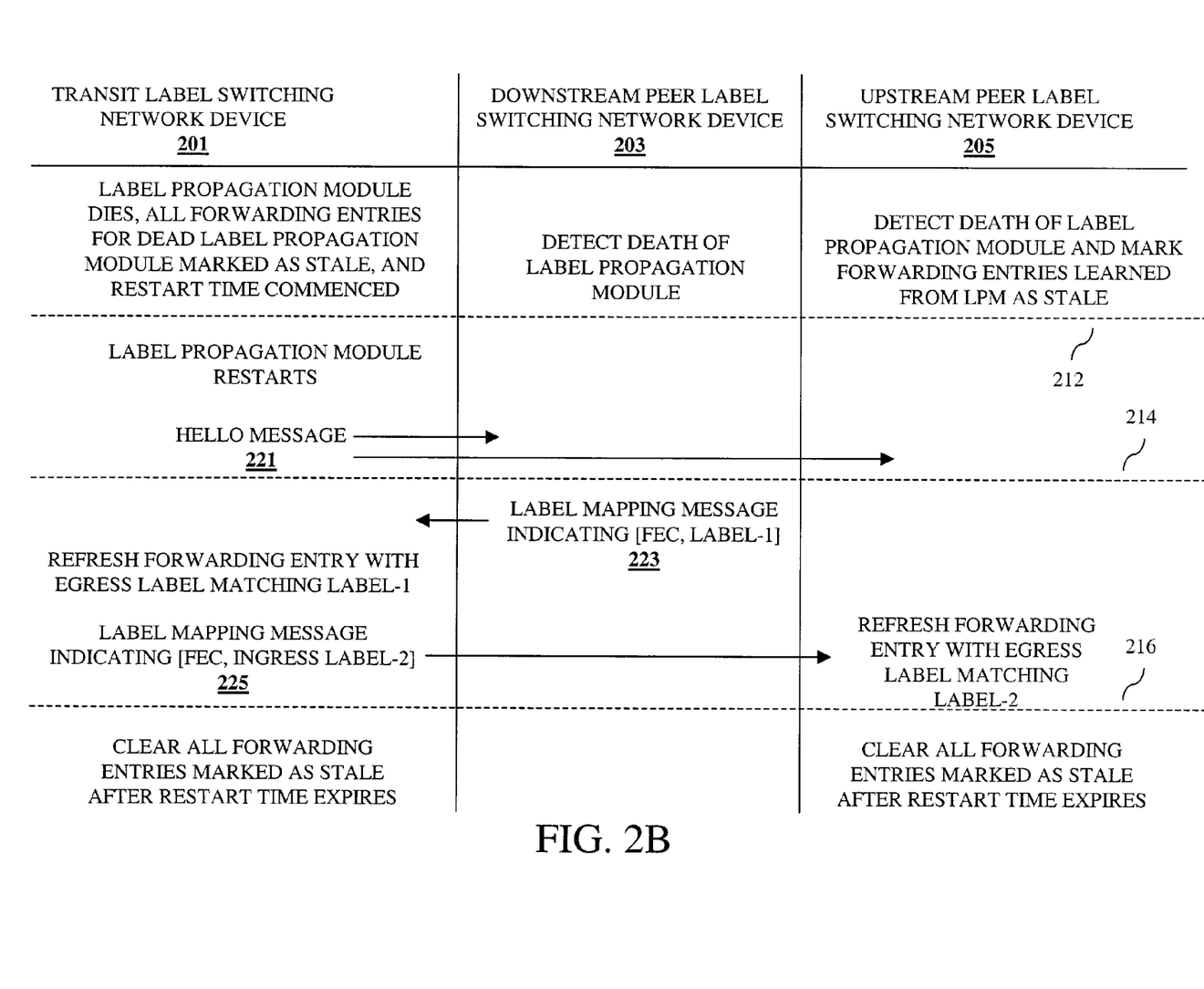
FIG. 2B is an exemplary diagram illustrating communications between peer label switching network devices after the transit label switching network device restarts according to one embodiment of the invention.

FIG. 2B is an exemplary diagram illustrating communications between peer label switching network devices after the transit label switching network device restarts according to one embodiment of the invention. In FIG. 2B, a dashed line 212 separates a fourth time frame from a fifth time frame. At the transit peer label switching network device 201 in the fourth time frame, a label propagation module dies. The label propagation module is software and/or hardware that implements a protocol for propagating labels to establish the LSP (e.g. LDP, RSVP, BGP, etc.). The label propagation module may die because of an error in software, a software reload for maintenance purposes, etc. In response to the label propagation module dying, all forwarding entries with labels propagated by the label propagation module are marked as stale and a restart time commences. In the fourth time frame, the downstream peer label switching network device 203 and the upstream peer label switching network device 205 detect the death of the label propagation module on the transit label switching network device 201. In response to detecting the death of the label propagation module, the upstream peer label switching network device 205 marks all forwarding entries previously learned from the dead label propagation module as stale.

At the transit label switching network device 201 in the fifth time frame, the label propagation module restarts. After the label propagation module restarts, it transmits a hello message 221 both to the downstream peer label switching network device 203 and the upstream peer label switching network device 205.

A dashed line 214 separates the fifth time frame from a sixth time frame. In the sixth time frame, the downstream peer label switching network device 203 transmits a label mapping message 223 to the transit label switching network device 201. The label mapping message 223 indicates the binding [FEC, LABEL-1]. The transit label switching network device 201 refreshes the forwarding entry with an egress label matching LABEL-1. Within the sixth time frame, the transit label switching network device 201 transmits a label mapping message 225 to the upstream peer label switching network device 205. The label mapping message 225 indicates the binding [FEC, LABEL-2]. The upstream peer label switching network device 205 refreshes the forwarding entry that matches the label binding [FEC, LABEL-2] indicated in the label mapping message 225.

A dashed line 216 separates the sixth time frame from a seventh time frame. In the seventh time frame, the transit label switching network device 201 and the upstream peer label switching network device 205 clear all forwarding entries still marked as stale after the restart time expires.

Gracefully restarting a label propagation module enables 1) non-stop forwarding of traffic along an LSP that traverses the label switching network device hosting the restarted label propagation module and 2) recapturing currently allocated and propagated labels.

Figure 3A:
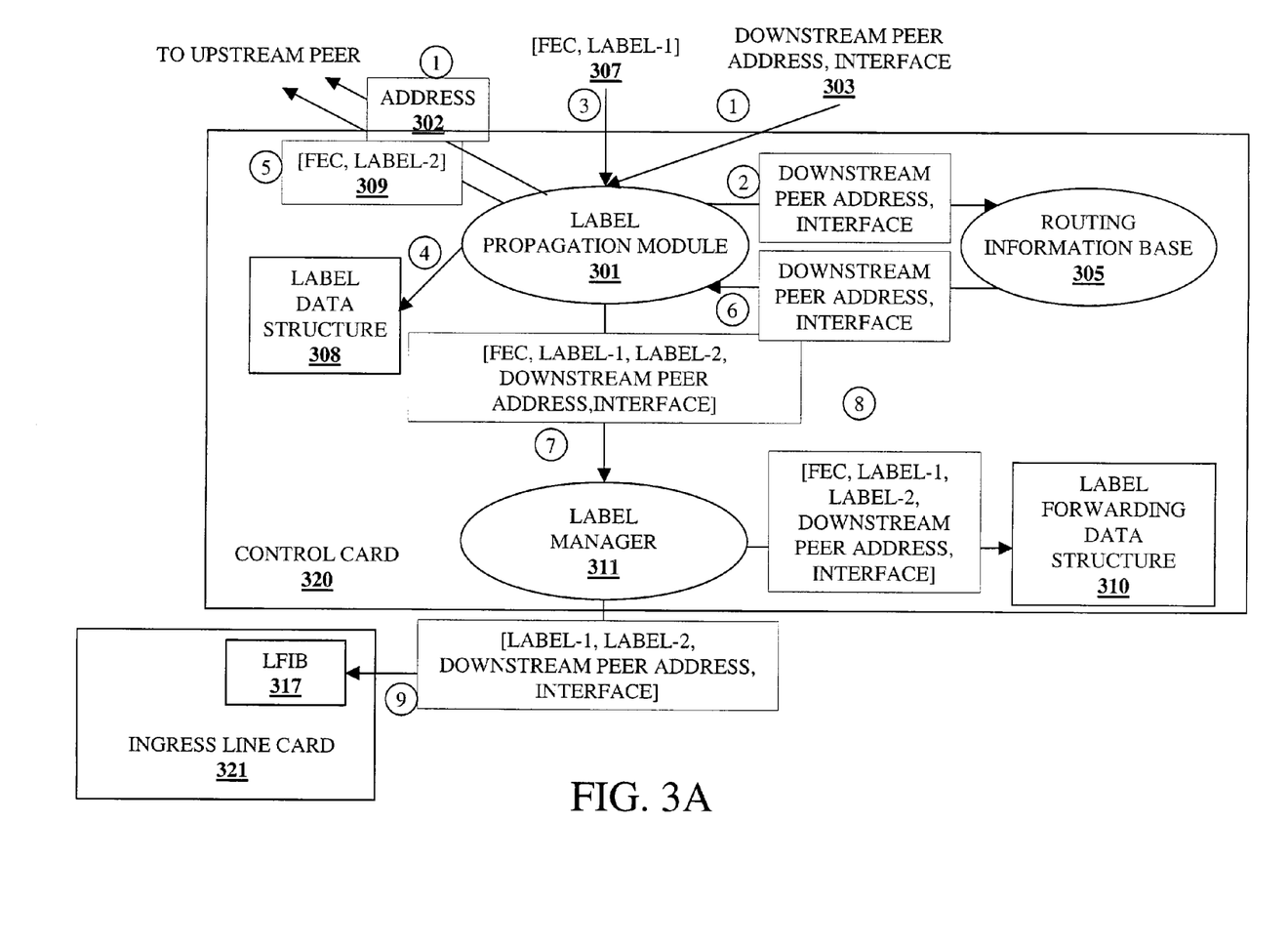
FIG. 3A is an exemplary diagram illustrating label propagation in a transit label switching network device according to one embodiment of the invention.

FIG. 3A is an exemplary diagram illustrating label propagation in a transit label switching network device according to one embodiment of the invention. In FIG. 3A at a time 1, a message 303 indicating a downstream peer address and the interface are received by a label propagation module 301. Also at time 1, the label propagation module 301 transmits a peer address message 302 that indicates its address to an upstream peer label switching network device. At a time 2, the label propagation module 301 passes the received downstream peer address and the interface to a routing information base (RIB) 305. At a time 3, the label propagation module 301 receives a message 307 that indicates a label binding [FEC, LABEL-1], in which LABEL-1 is the egress label for the LSP. At a time 4, the label propagation module 301 allocates a LABEL-2 as an ingress label for the LSP in accordance with a label data structure 308. The terms ingress label and egress label are relational terms. From the perspective of the transit label switching network device, LABEL-1 is an egress label, but from the perspective of the downstream label switching network device, LABEL-1 is an ingress label. At a time 5, the label propagation module 301 transmits a label mapping message 309 that indicates the label binding [FEC, LABEL-2]. At a time 6, the label propagation module 301 retrieves the downstream peer address and its corresponding interface from the RIB 305. While in one embodiment of the invention the label propagation module retrieves information from the RIB, in alternative embodiments of the invention the label manager communicates with the RIB 305 to retrieve information. In one embodiment of the invention, the label propagation module 301 passes the downstream peer address and the interface to the RIB 305 and the label manager 311 retrieves the downstream peer address and the interface from the routing information base 305. In another embodiment of the invention, the RIB 305 receives the downstream address and the interface from a different module. In another embodiment of the invention, the label propagation module 301 passes the downstream peer address and the interface to a label manager 311 and the label manager 311 inserts or passes the downstream peer address and the interface to the RIB 305.

At a time 7, the label propagation module 301 passes the FEC, LABEL-1, LABEL-2, downstream peer address, and the interface to a label manager 311. At a time 8, the label propagation module 301 adds a forwarding entry with an egress label that is the LABEL-1, an ingress label that is the LABEL-2, the downstream peer address, and the interface to a label forwarding data structure 310. At a time 9, the label manager 311 passes the LABEL-1, the LABEL-2, the downstream peer address, and the interface to a label forwarding information base (LFIB) 317 located on a line card 320.

The order of operations illustrated in FIG. 3A is meant to be exemplary in aiding in the understanding of the invention and not meant to be limiting upon the invention. For example, the operation taking place at time 5 could take place after time 6 or 7. In addition, the operation taking place at time 5 may take place before time 4.

Figure 3B:
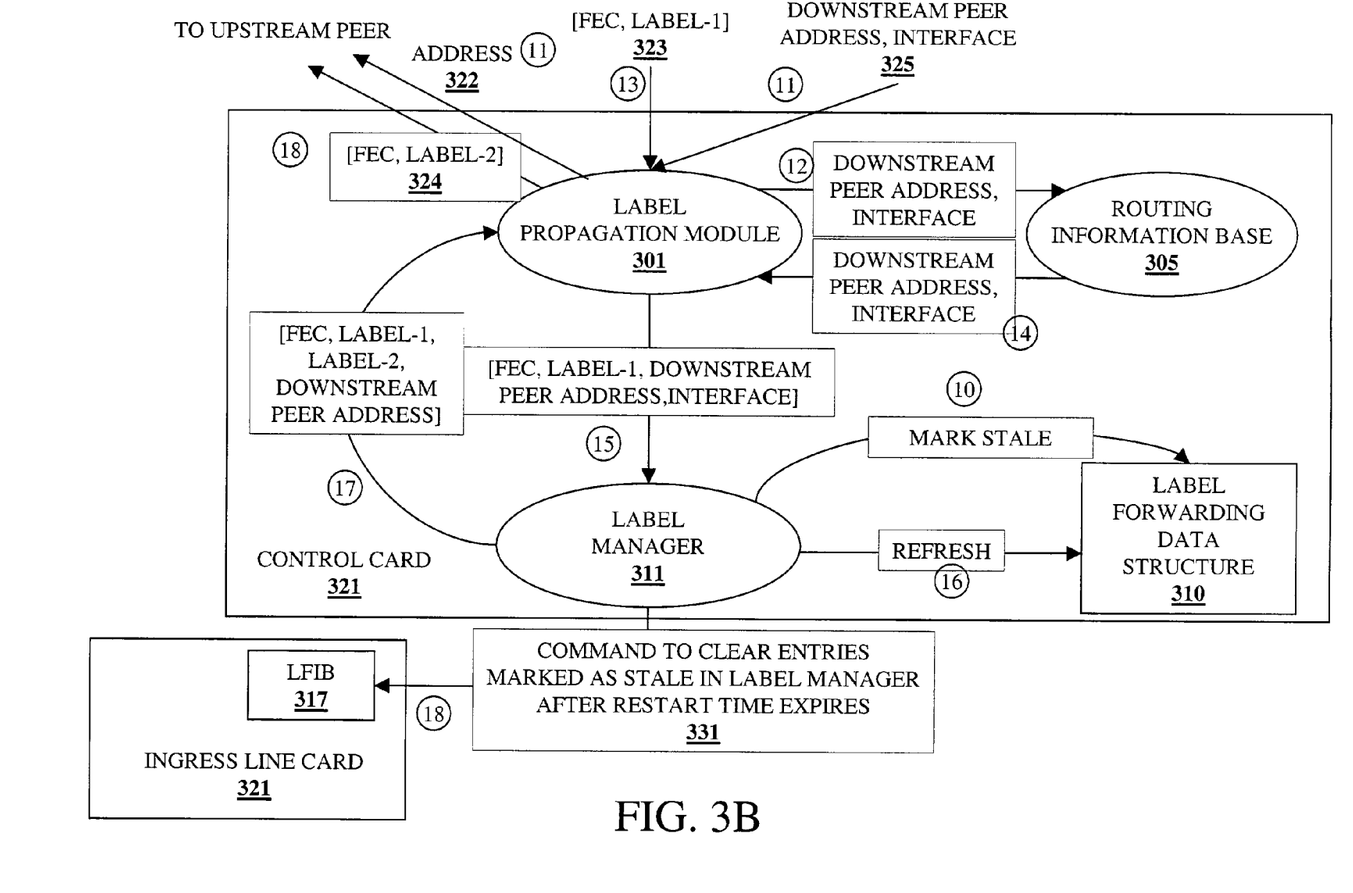
FIG. 3B is an exemplary diagram illustrating propagation of labels in a transit peer label switching network device after the transit label switching network device have restarted according to one embodiment of the invention.

FIG. 3B is an exemplary diagram illustrating propagation of labels in a transit peer label switching network device after the transit label switching network device has restarted according to one embodiment of the invention. At time 10 in FIG. 3B, the label manager 311 marks all forwarding entries in the label forwarding data structure 310 as stale in response to the label propagation module 301 dying. After the label propagation module 301 restarts, at a time 11 the label propagation module 301 receives a message 325 indicating the downstream peer address and the interface previously indicated in the message 303. At a time 12, the label propagation module 301 passes the downstream peer address and the interface to the RIB 305. At a time 13, the label propagation module 301 receives a label mapping message 323 indicating the label binding [FEC, LABEL-1] previously indicated in the message 307. At a time 14, the label propagation module retrieves the downstream peer address and the interface for the FEC indicated in the label mapping message 323 from the RIB 305. At a time 15, the label propagation module 301 passes the FEC, LABEL-1, downstream peer address, and the interface to the label manager 311. At a time 16, the label propagation module 301 finds and refreshes the forwarding entry that matches the FEC, LABEL-1, downstream peer address, and the interface. At a time 17, the label manager 311 retrieves the refreshed forwarding entry that includes the ingress label LABEL-2, and passes the forwarding entry to the label propagation module 301. At a time 18, the label propagation module 301 transmits a label mapping message that indicates the label binding [FEC, LABEL-2] previously indicated in the label mapping message 309, thus recapturing the LABEL-2. At a time 19, the label manager 311 sends a command 331 to the LFIB 317 to clear all entries marked as stale in the label manager after the restart time expires.

By recapturing a previously propagated label, a label switching network device efficiently reestablishes the label for the LSP. The label switching network device does not expend resources 1) indiscriminately clearing all forwarding entries on the control card and one or more line cards, 2) allocating another label to be propagated, 3) adding a forwarding entry on the control card for the newly propagated label, and 4) adding a forwarding entry on one or more line cards for the newly propagated label.

Figure 4A:
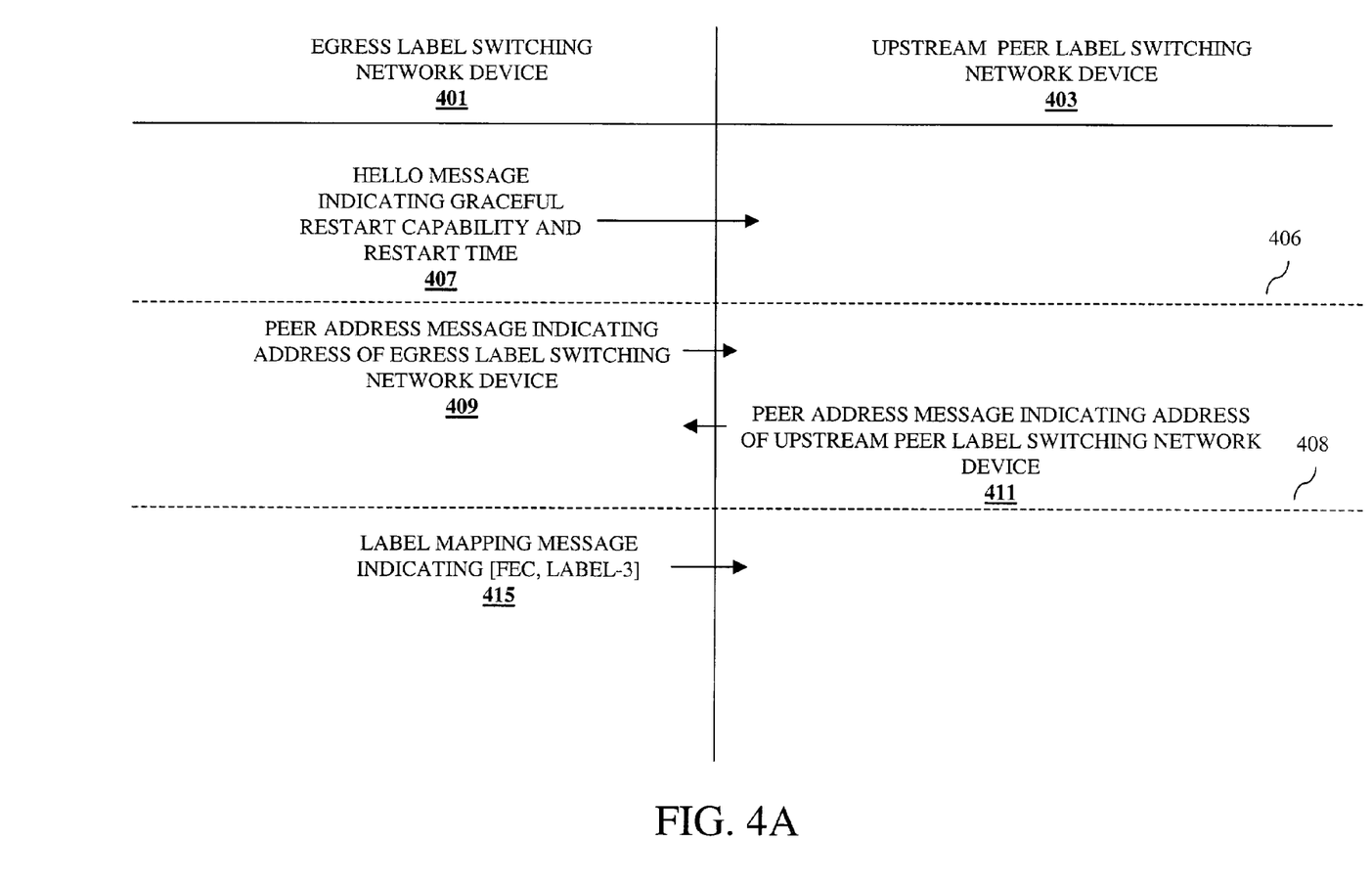
FIG. 4A is an exemplary diagram illustrating communications for an egress label switching network device to propagate a label according to one embodiment of the invention.
Figure 4B:
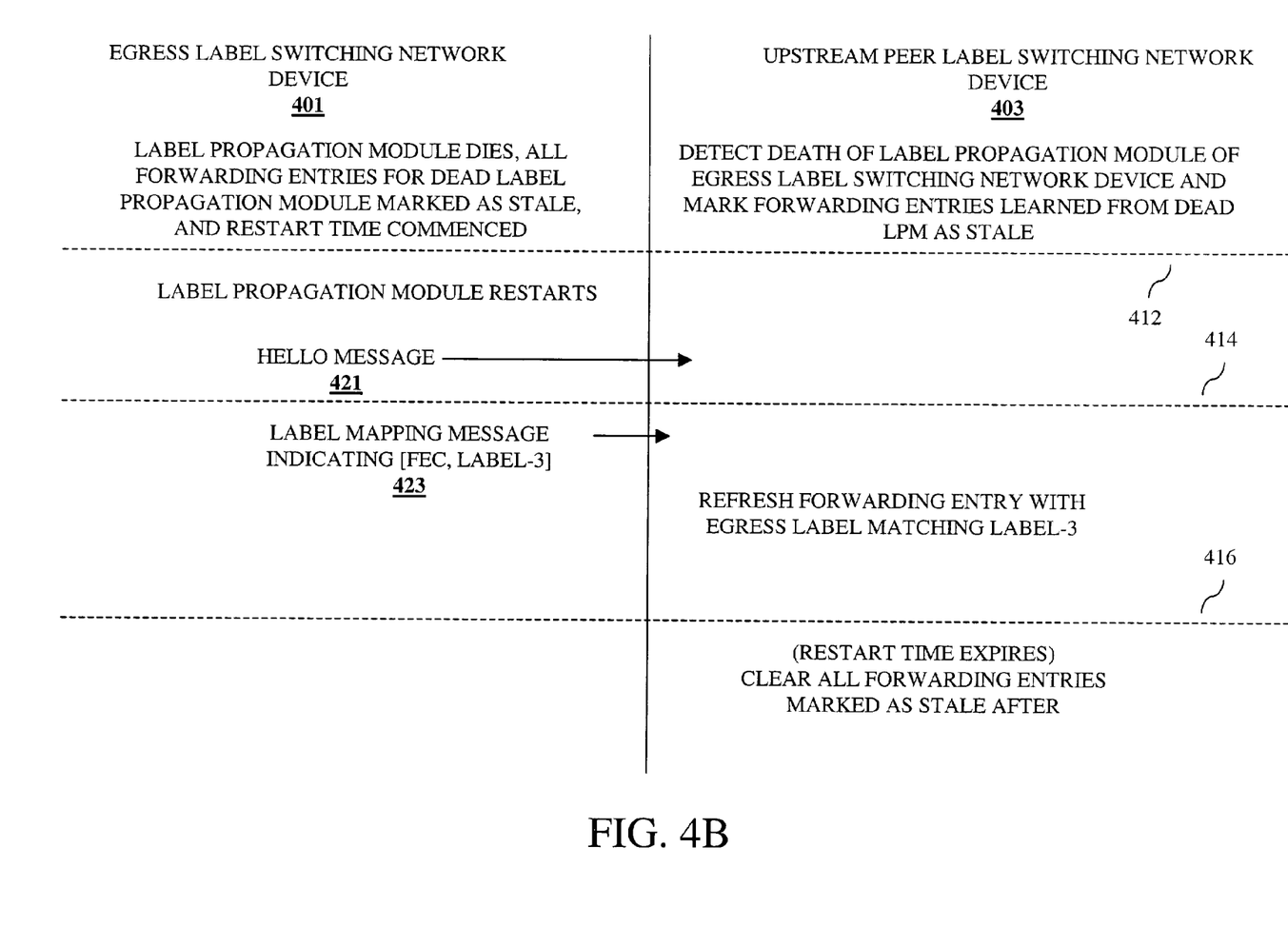
FIG. 4B is an exemplary diagram illustrating communications after the egress label switching network device has restarted according to one embodiment of the invention.

FIGS. 4A–4B are exemplary diagrams illustrating communications for graceful restart for an egress label switching network device according to one embodiment of the invention. FIG. 4A is an exemplary diagram illustrating communications for an egress label switching network device to propagate a label according to one embodiment of the invention. In FIG. 4A, a dashed line 406 separates a first time frame from a second time frame. In the first time frame, an egress label switching network device 401 transmits a hello message 407 to an upstream peer label switching network device 403. The hello message 407 indicates graceful restart capability of the egress label switching network device 401 and a restart time. In the second time frame, the egress label switching network device 401 transmits a peer address message 409 to the upstream peer label switching network device 403. The peer address message 409 indicates the address of the egress label switching network device 401. Also in the second time frame, the upstream peer label switching network device 403 transmits a peer address message 411 to the egress label switching network device 401. The peer address message 411 indicates the address of the upstream peer label switching network device 403.

A dashed line 408 separates the second time frame from a third time frame. In the third time frame, the egress label switching network device 401 transmits a label mapping message 413 to the upstream peer label switching network device 403. The label mapping message 415 indicates a label binding [FEC, LABEL-3].

FIG. 4B is an exemplary diagram illustrating communications after the egress label switching network device has restarted according to one embodiment of the invention. In FIG. 4B, a dashed line 412 separates a fourth time frame from a fifth time frame. In the fourth time frame, a label propagation module of the egress label switching network device 401 dies. In response to the label propagation module of the egress label switching network device 401 dying, all forwarding entries for the dead label propagation module are marked as stale and the restart time is commenced. The upstream peer label switching network device 403 detects the death of the label propagation module of the egress label switching network device 401 and marks all forwarding entries learned from the dead label propagation module as stale. In the second time frame, the label propagation module of the egress label switching network device 401 restarts. Also in the second time frame, the egress label switching network device 401 transmits a hello message 421 to the upstream peer label switching network device 403.

A dashed line 414 separates a fifth time frame from a sixth time frame. In the sixth time frame, the egress label switching network device 401 transmits a label mapping message 423 to the upstream peer label switching network device 403. The label mapping message 423 indicates a binding of [FEC, LABEL-3] similar to the label mapping message 415. Also in the sixth time frame, the upstream peer label switching network device 403 refreshes a forwarding entry with an egress label that matches LABEL-3.

A dashed line 416 separates the sixth time frame from a seventh time frame. In the seventh time frame, the restart time has expired and the upstream peer label switching network device 403 clears all forwarding entries with labels learned from the restarted label propagation module which are marked as stale.

Figure 5A:
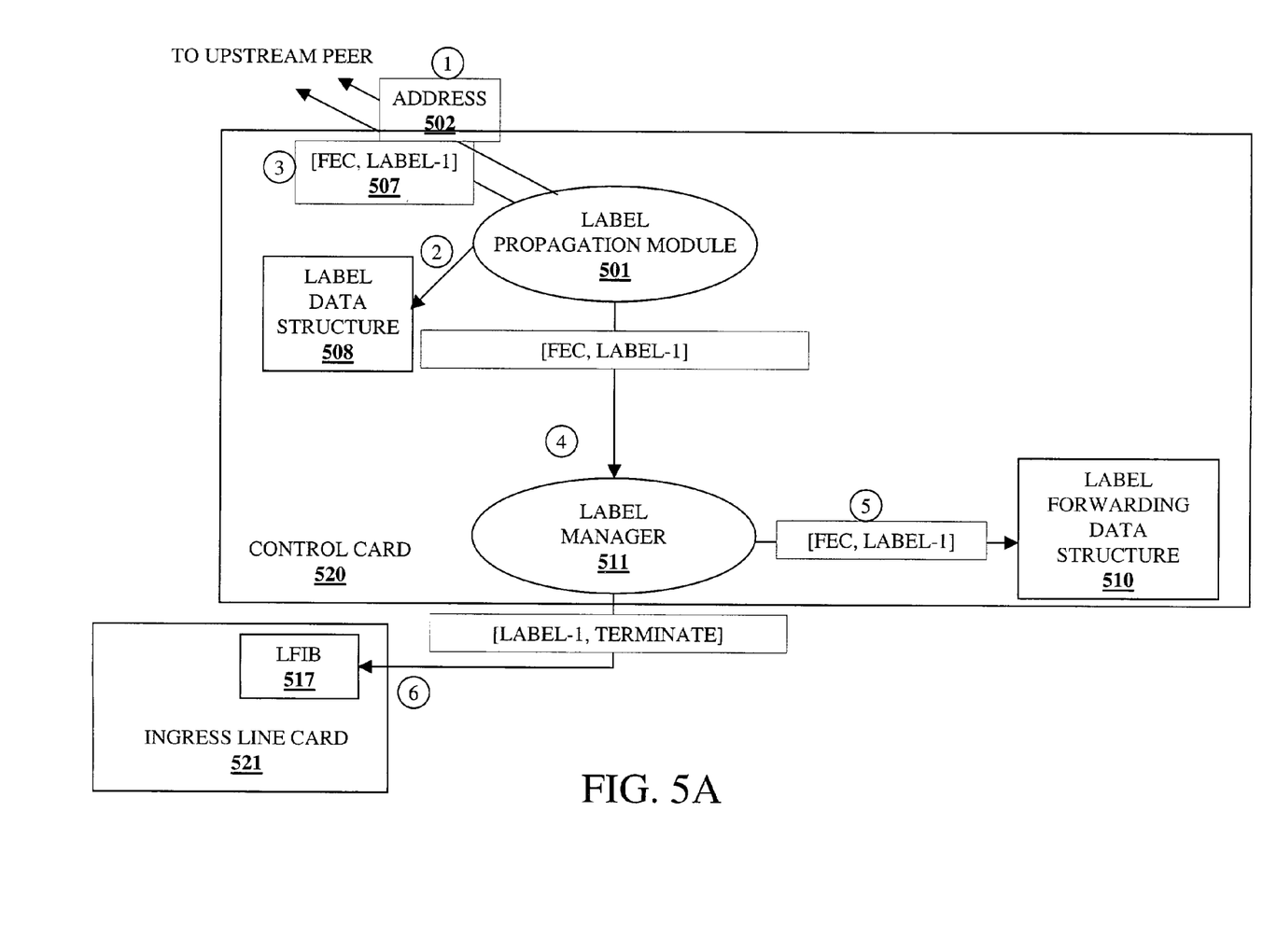
FIG. 5A is an exemplary diagram illustrating an egress label switching network device propagating a label according to one embodiment of the invention.
Figure 5B:
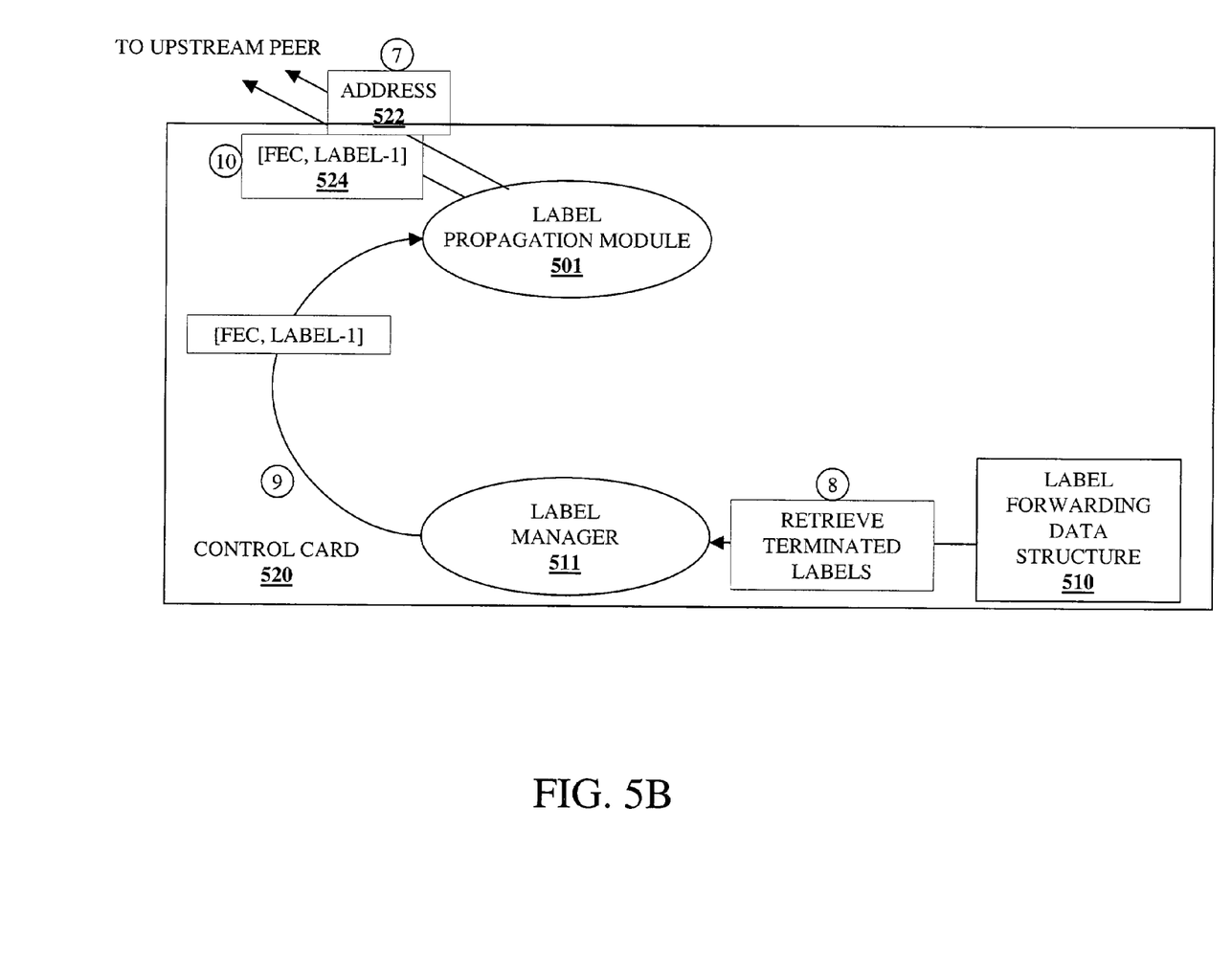
FIG. 5B is an exemplary diagram illustrating the egress label switching network device recapturing a previously propagated label according to one embodiment of the invention.

FIGS. 5A–5B are exemplary diagrams illustrating propagating and recapturing a label in an egress label switching network device according to one embodiment of the invention. FIG. 5A is an exemplary diagram illustrating an egress label switching network device propagating a label according to one embodiment of the invention. In FIG. 5A at a time 1, a label propagation module 501 that is hosted on a control card 520 transmits its address to an upstream peer label switching network device. At a time 2, the label propagation module 501 allocates a label in accordance with a label data structure 508. At a time 3, the label propagation module 501 communicates a label mapping message 507 that indicates a binding [FEC, LABEL-1] to the upstream peer label switching network device. At a time 4, the label propagation module 501 communicates the label binding [FEC, LABEL-1] to a label manager 511. At a time 5, the label manager 511 communicates the binding [FEC, LABEL-1] to a label forwarding data structure 510. At a time 6, the label manager 511 communicates to an LFIB 517 hosted on an ingress line card 521 LABEL-1 and an indication to terminate the corresponding label switched path.

FIG. 5B is an exemplary diagram illustrating the egress label switching network device recapturing a previously propagated label according to one embodiment of the invention. In FIG. 5B at a time 7, the label propagation module 501 communicates its address in a peer address message 522 to the upstream peer label switching network device. At a time 8, the label manager 511 retrieves labels to be terminated at the egress label switching network device and their corresponding FECs from the label forwarding label structure 510. The retrieved labels and FECs include FEC and LABEL-1. At a time 9, the label manager 511 communicates the binding [FEC, LABEL-1] to the label propagation module 501. At a time 10, the label propagation module 501 transmits a label mapping message 524 to the upstream peer label switching network device. The label mapping message 524 indicates the binding of [FEC, LABEL-1].

Although the illustrations are described with reference to a single label, multiple labels may be propagated, marked as stale, refreshed, and recaptured.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

I claim:

1. A method in a network device comprising:
    refreshing a set of one or more labels after a label propagation module has restarted, the set of one or more labels having been allocated for the label propagation module prior to the label propagation module dying, wherein refreshing a set of labels comprises modifying a set of values, wherein each of the set of values is associated with a different one of the set of labels; and
    communicating the refreshed set of labels to a set of one or more peer label switching network devices.

2. The method of claim 1 wherein the label propagation module is software and/or hardware implementing the Border Gateway Protocol, the Label Distribution Protocol, and/or the Resource Reservation protocol.

3. The method of claim 1 further comprising forwarding a packet with having one of the set of labels in accordance with a forwarding entry that indicates the one of the set of labels.

4. A method in a network device comprising:
    receiving a first label mapping message indicating a first label and a forward equivalence class (FEC), the first label mapping message for a label propagation module;
    allocating a second label for the label propagation module;
    transmitting a second label mapping message indicating the second label and the FEC;
    marking the second label as stale in response to the label propagation module dying;
    if a third message indicating the first label and the FEC is received within a time period,
        refreshing the second label, and
        transmitting a fourth message indicating the refreshed second label and the FEC; and
    clearing the second label if marked as stale after the time period expires.

5. The method of claim 4 wherein marking the second label as stale comprises setting a bit in a data structure corresponding to the second label to a value that indicates stale.

6. The method of claim 4 wherein clearing the second label comprises removing the second label from forwarding tables.

7. The method of claim 4 wherein the label propagation module is software and/or hardware implementing the Border Gateway Protocol, the Label Distribution Protocol, and/or the Resource Reservation protocol.

8. The method of claim 4 further comprising forwarding a packet with the second refreshed label.

9. A method in a network device comprising:
    communicating to a set of peer label switching network devices graceful restart capability of said network device and a time period;
    marking forwarding entries for the label propagation module as stale in response to the label propagation module dying;
    reestablishing communication with the set of peer label switching network devices in response to the label propagation module restarting, the label propagation module for propagating labels for one or more label switched paths (LSPs) traversing the network device;
    receiving a first set of one or more label-forward equivalence class (FEC) bindings for the label propagation module from a first subset of the set of peer label switching network devices;
    refreshing those forwarding entries that indicate the received set of label-FEC bindings;
    communicating a second set of label-FEC bindings that correspond to the refreshed forwarding entries to a second subset of the set of peer label switching network devices; and
    clearing those forwarding entries that are marked as stale after the refresh time expires.

10. The method of claim 9 wherein the label propagation module is software and/or hardware implementing the Border Gateway Protocol, the Label Distribution Protocol, and/or the Resource Reservation protocol.

11. The method of claim 9 further comprising forwarding a set of one or more packets in accordance with the refreshed forwarding entries.

12. A network device comprising:
    a line card to store a label forwarding information base; and
    a control card coupled with the line card, the control card having a label propagation module to,
        allocate labels from a label data structure and communicate the allocated labels to upstream network devices, and
        receive labels from downstream network devices,
    a label manager to receive the allocated labels and the downstream network devices labels from the label propagation module, the label manager to,
        store the allocated labels and downstream network devices labels in a label forwarding data structure,
        set a restart time upon the label propagation module failing, and
        determine, at expiration of the restart time, which labels stored in the label forwarding information base should be cleared, the determination based upon labels received, after the label propagation module restarts, from downstream network devices and entries previously stored in the label forwarding data structure, and cause the determined labels to be cleared from the label forwarding information base.

13. The network device of claim 12 wherein the label forwarding data structure includes forwarding entries for the labels.

14. The network device of claim 12 further comprising the label manager to update the label forwarding information base in accordance with the label forwarding data structure.

15. A network comprising:
a first peer label switching network device, the first peer label switching device to propagate a first label for a label switched path (LSP);
a second peer label switching network device; and
a transit peer label switching network device coupled with the first and second peer label switching network device, the transit peer label switching network device being an intermediate point along said LSP, the transit peer label switching network device having,
a label propagation module (LPM) to,
propagate a second label to the second peer label switching network device, and
receive the first label from the first peer label switching network device, and
a label manager to,
upon a software failure in the LPM,
set a restart time interval, and
determine, at restart time interval expiration, whether to remove the first label previously received from the first peer label switching network device.

16. The network of claim 15 further comprising the transit peer label switching network device to transmit a label mapping message to the first peer label switching network device, wherein the label mapping message indicates the first label.

17. A machine-readable medium that provides instructions, which when execute by a set of one or more processors, cause said set of processors to perform operations comprising:
refreshing a set of one or more labels after a label propagation module has restarted, the set of one or more labels having been allocated for the label propagation module prior to the label propagation module dying, wherein refreshing a set of labels comprises modifying a set of values, wherein each of the set of values is associated with a different one of the set of labels; and
communicating the refreshed set of labels to a set of one or more peer label switching network devices.

18. The machine-readable medium of claim 17 wherein the label propagation module is software and/or hardware implementing the Border Gateway Protocol, the Label Distribution Protocol, and/or the Resource Reservation protocol.

19. The machine-readable medium of claim 17 further comprising forwarding a packet with having one of the set of labels in accordance with a forwarding entry that indicates the one of the set of labels.

20. A machine-readable medium that provides instructions, which when executed by a set of one or more processors, cause said set of processors to perform operations comprising:
receiving a first label mapping message indicating a first label and a forward equivalence class (FEC), the first label mapping message for a label propagation module;
allocating a second label for the label propagation module;
transmitting a second label mapping message indicating the second label and the FEC;
marking the second label as stale in response to the label propagation module dying;
if a third message indicating the first label and the FEC is received within a time period,
refreshing the second label, and
transmitting a fourth message indicating the refreshed second label and the FEC; and
clearing the second label if marked as stale after the time period expires.

21. The machine-readable medium of claim 20 wherein marking the second label as stale comprises setting a bit in a data structure corresponding to the second label to a value that indicates stale.

22. The machine-readable medium of claim 20 wherein clearing the second label comprises moving the second label from forwarding tables.

23. The machine-readable medium of claim 20 wherein the label propagation module is software and/or hardware implementing the Border Gateway Protocol, the Label Distribution Protocol, and/or the Resource Reservation protocol.

24. The machine-readable medium of claim 20 further comprising forwarding a packet with the second refreshed label.

25. A machine-readable medium that provides instructions, which when executed by a set of one or more processors, cause said set of processors to perform operations comprising:
communicating to a set of peer label switching network devices graceful restart capability of said network device and a lime period;
marking forwarding entries for the label propagation module as stale in response to the label propagation module dying;
reestablishing communication with the set of peer label switching network devices in response to the label propagation module restarting, the label propagation module for propagating labels for one or more label switched paths (LSPs) traversing the network device;
receiving a first set of one or more label-forward equivalence class (FEC) bindings for the label propagation module from a first subset of the set of peer label switching network devices;
refreshing those forwarding entries that indicate the received set of label-FEC bindings;
communicating a second set of label-FEC bindings that correspond to the refreshed forwarding entries to a second subset of the set of peer label switching network devices; and
clearing those forwarding entries that are marked as stale after the refresh time expires.

26. The machine-readable medium of claim 25 wherein the label propagation module is software and/or hardware implementing the Border Gateway Protocol, the label Distribution Protocol, and/or the Resource Reservation protocol.

27. The machine-readable medium of claim 25 further comprising forwarding a set of one or more packets in accordance with the refreshed forwarding entries.

* * * * *